(12) United States Patent
Koyama

(10) Patent No.: US 6,919,991 B2
(45) Date of Patent: Jul. 19, 2005

(54) OPTICAL DEVICE AND METHOD OF MANUFACTURE OF THE SAME, DISPLAY DEVICE, ELECTRONIC DEVICE, AND DETECTION DEVICE

(75) Inventor: Minoru Koyama, Matsumoto (JP)

(73) Assignee: Seiko Epson Corporation (JP)

(*) Notice: Subject to any disclaimer, the term of this patent is extended or adjusted under 35 U.S.C. 154(b) by 116 days.

(21) Appl. No.: 10/666,944

(22) Filed: Sep. 18, 2003

(65) Prior Publication Data

US 2004/0125190 A1 Jul. 1, 2004

(30) Foreign Application Priority Data

Sep. 20, 2002 (JP) ......................... 2002-275912
Aug. 22, 2003 (JP) ......................... 2003-299196

(51) Int. Cl.⁷ ............................................. G02B 27/10
(52) U.S. Cl. ..................... 359/619; 359/626; 349/106; 347/106
(58) Field of Search ............................. 359/619–626; 349/106; 347/106, 241, 244

(56) References Cited

U.S. PATENT DOCUMENTS 5,734,190 A * 3/1998 Hawkins et al. ............ 257/432
6,630,274 B1 * 10/2003 Kiguchi et al. ................ 430/7
6,700,708 B2 * 3/2004 Houlihan et al. ............ 359/618
2002/0145807 A1 * 10/2002 Nishikawa ................... 359/619
2004/0036823 A1 * 2/2004 Nishikawa ................... 349/106

FOREIGN PATENT DOCUMENTS

| JP | 03-063626 | 3/1991 |
| JP | 07-281169 | 10/1995 |
| JP | 08-094825 | 4/1996 |
| JP | 10-168386 | 6/1998 |
| JP | 2000-019476 | 1/2000 |
| JP | 2000-232883 | 8/2000 |
| JP | 2002-273869 | 9/2002 |
| JP | 2003-090910 | 3/2003 |
| JP | 2003-159786 | 6/2003 |
| JP | 2003-159787 | 6/2003 |

* cited by examiner

Primary Examiner—Huy Mai
(74) Attorney, Agent, or Firm—Harness, Dickey & Pierce, P.L.C.

(57) ABSTRACT

A method of manufacture of an optical device comprises a process of forming a bank 11 which demarcates a region in which a functional material is distributed, and a process of distributing a lens material 12 in the liquid state in the region which is demarcated by the bank 11, and of thereby forming a lens 13 which is layered against the functional material 14, 15, 16.

14 Claims, 11 Drawing Sheets

STRIPE

MOSAIC

DELTA

OPTICAL DEVICE AND METHOD OF MANUFACTURE OF THE SAME, DISPLAY DEVICE, ELECTRONIC DEVICE, AND DETECTION DEVICE

BACKGROUND OF THE INVENTION

1. Field of the Invention

The present invention relates to an optical device which includes a layer which is made from a functional material, to a method of manufacture of the same, and to a display device, an electronic device, and a detection device.

Priority is claimed on Japanese Patent Application No. 2002-275912, filed Sep. 20, 2002, and on Japanese Patent Application No. 2003-299196, filed on Aug. 22, 2003, and the contents of which are incorporated herein by reference.

2. Description of Related Art

As an optical device which includes a layer made from a functional material, for example, there is a color filter which incorporates a layer of material of a predetermined color (a colored material layer). In order to enhance the optical performance of such an optical device, it is per se known to utilize a structure in which the layer of optical functional material (the colored material layer and so on) and a lens (a micro lens) are combined together.

If a plurality of functional material layers are present in an optical device having the above-described structure, lenses are provided for each one of that plurality of functional material layers. In a method of manufacture for this type of optical device, the plurality of functional material layers and the lens bodies which includes the plurality of lenses which correspond thereto are individually fabricated, and, after this, they are mutually set into position and are adjusted, and are adhered together.

However, with the above-described method of manufacture, it is difficult accurately to adjust the optical centers of the lenses with respect to the positions of all of the plurality of layers of functional material, and positional deviation easily occurs. Such a positional deviation can easily lead to deterioration of optical performance, which can cause non-uniformity in the display quality.

The objective of the present invention is to provide a method of manufacture of an optical device, which can manufacture an optical device in which deviation of mutual positioning between the optical functional material and the lens is small, and whose performance is high.

Another objective of the present invention is to provide an optical device whose optical performance can be expected to be enhanced.

Another objective of the present invention is to provide a display device whose display performance can be expected to be enhanced.

Another objective of the present invention is to provide an electronic device whose quality can be expected to be enhanced, and a detection device whose detection capability can be expected to be enhanced.

SUMMARY OF THE INVENTION

The method of manufacture of an optical device of the present invention including a process of distribution of a functional material in a predetermined region upon a substrate, includes: a process of formation of a lens within a bank which demarcates said predetermined region, using a lens material in the liquid state; and a process of distribution of said functional material within said bank.

And said process of formation of said lens using said lens material in the liquid state includes, for example, a process of distribution of said lens material in the liquid state within said bank, and a process of drying said lens material.

With the above-described method of manufacture of an optical device, since both the functional material and the lens material are distributed in the regions which have been demarcated by the bank, accordingly the functional material and the lens are accurately layered together within the bank. In other words, deviation of the positional alignment between the optical functional material and the lens is prevented by the bank. Accordingly, it is possible to manufacture an optical device whose optical performance is high.

In the above described method of manufacture of an optical device, there may be further included, before said process of distribution of said lens material, a process of processing the surface of said bank so as to increase its lyophobicity or lyophilicity against said lens material.

The lyophobicity means a characteristic of exhibiting non-affinity with respect to the lens material; and the lyophilicity means a characteristic of exhibiting affinity with respect to the lens material.

For example, by taking advantage of surface tension, a convex lens may be formed in said demarcated region by said processing of said surface of said bank to increase its lyophobicity.

Moreover, for example, again by taking advantage of surface tension, a concave lens may be formed in said demarcated region by said processing of said surface of said bank to increase its lyophilicity.

In the above described method of manufacture of an optical device, a liquid drop discharge method in which liquid material is discharged in the form of liquid drops may be utilized for distribution of at least one of said functional material and said lens material. By discharging the liquid material in the form of liquid drops, it is possible to distribute the functional material or the lens material accurately in the region which is demarcated by the bank.

In the above described method of manufacture of an optical device, a liquid drop discharge method in which liquid material is discharged in the form of liquid drops may be utilized for distribution of material for formation of said bank which demarcates said predetermined region.

In the above-described method of manufacture of an optical device, the plan view form of the region which is demarcated by said bank may be polygonal, elliptical, or roughly circular. By making the plan view form of the region which is demarcated by said bank as polygonal, elliptical, or roughly circular, the surface tension operates effectively for formation of a lens which has a curved surface.

In the above-described method of manufacture of an optical device, said functional material may be a material which is used for color filter. In this case, it is possible to anticipate improvement of the performance of the resulting color filter.

In the above-described method of manufacture of an optical device, said functional material may be a reaction material for use in a biochip. In this case, by enhancing the optical performance, it is possible to anticipate improvement of detection performance.

And, with a detection device which utilizes a detection substrate which has been manufactured by the above-described method of manufacture of an optical device, it is possible to anticipate improvement of detection performance.

The optical device of the present invention is one in which a functional material is distributed in a predetermined region upon a substrate, and it includes: a bank which demarcates a region in which said functional material is distributed; and a lens which is disposed in said region which has been demarcated by said bank, and which is layered against said functional material.

According to the above described optical device, since both the functional material and the lens material are distributed within the region which has been demarcated by the bank, therefore the functional material and the lens are accurately layered together within the bank, and, due to this, deviation of the positional alignment between the optical functional material and the lens is prevented. Accordingly, it is possible to anticipate an enhancement of the optical performance.

The display device according to the present invention incorporates a color filter which has been manufactured by the method of manufacture of an optical device described above.

With the above described display device, it is possible to anticipate enhancement of the display performance, because improvement of the color filter performance can be expected.

The electronic device according to the present invention incorporates a display device as described above.

With the above-described electronic device, it is possible to anticipate improvement of the product quality, because it incorporates a display device which is endowed with superior display performance.

DETAILED DESCRIPTION OF THE INVENTION

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

FIGS. 1A through 1E are figures which show in schematic form a method of manufacture of a color filter, which is an optical device, as a preferred embodiment of the present invention. The color filter which is to be manufactured is to have a structure in which a layer made from a color material and a lens (a micro-lens) are combined together. The method of manufacture of a color filter according to this preferred embodiment includes a bank formation process (FIG. 1A), a lyophobicity enhancement process (FIG. 1B), a lens material distribution process (FIG. 1C), a lens solidification process (FIG. 1D), a functional material distribution process (FIG. 1E), and so on. For distribution of the lens material and of the functional material, there is utilized a liquid drop discharge method in which a liquid material is discharged in liquid drop form via a nozzle of a discharge head, i.e. a so called ink-jet method.

As the substrate which is utilized for the color filter, a transparent or semi-transparent base plate is used.

A glass base plate, a quartz base plate, a resin base plate (a plastic base plate or a plastic film base plate) or the like may be utilized, for example, as the transparent or semi-transparent base plate, and in particular it is desirable to utilize a low cost soda glass base plate. The possibility of forming a semi conducting film, a metallic film, a dielectric film, an organic film or the like upon the surface of these various types of raw material base plate is also included.

The Bank Formation Process

Figure 1A:
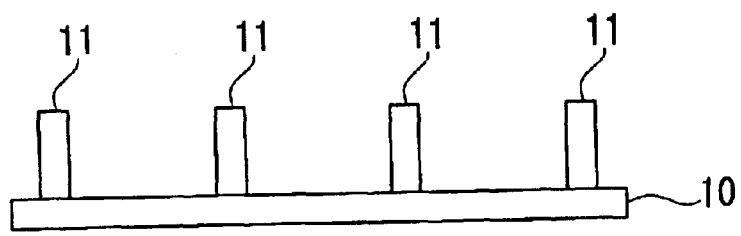
FIGS. 1A through 1E are figures showing in schematic form a method of manufacture of a color filter, which is an optical device which is a preferred embodiment of the present invention.

First, banks 11 are formed upon the substrate 10 so as to demarcate the regions upon which the color material is to be distributed, as shown in FIG. 1A. In concrete terms, for example, an insulating layer is formed upon the substrate 10 by coating a mixture consisting of a resist such as acrylic resin, polyimide resin or the like dissolved in a solvent by spin coating or dip coating or the like, and this insulating layer is etched by a photolithographic technique or the like. By doing this, the banks 11 are formed in a predetermined pattern upon the substrate 10. For the insulating layer, for example, acrylic resin, polyimide resin, fluoro type resin, silicon, or the like may be employed.

The Lyophobicity Enhancement Process

Figure 1B:
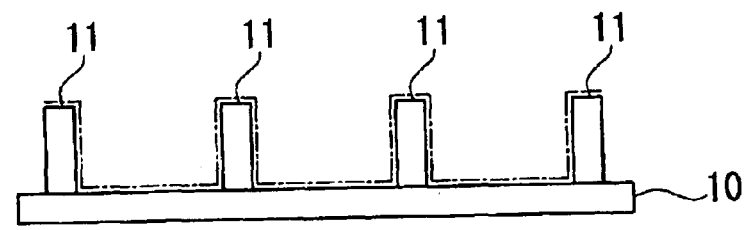

Next, as shown in FIG. 1B, before distributing the lens material, the surfaces of the banks 11 (including the wall surfaces) are subjected to a process of lyophobicity enhancement against the lens material. As such a method of lyophobicity enhancement, for example, there may be utilized a plasma processing method (a plasma polymerization method) or a eutectic plating method, or a method of lyophobicity enhancement with a metallic thiol, or a method of lyophobicity processing with FAS (freon alkyl silane) or the like, or any of various other per se known methods. Among these, the plasma processing method has the advantages that, by selection of the raw material and so on, along with being able to provide various characteristics on the surface which is the object of processing, its control can be performed easily.

With the above described plasma processing method, for example, a fluoro type processing gas such as tetra fluoro methane (tetra fluorocarbon) or the like is converted into plasma, and it is radiated against the surface of the object body ($CF_4$ plasma processing). By doing this, fluoro base is directed on the surface of the object body, and thereby it is endowed with enhanced lyophobicity. The processing gas is not limited to being tetra fluoro methane (tetra fluorocarbon); other types of fluorocarbon gas could be utilized. Furthermore, a processing gas other than a fluorocarbon type gas could be utilized, provided that it was capable of endowing the surface of the object body with enhanced lyophobicity against the liquid material.

According to the above-described plasma processing method, when imparting lyophobicity to the banks, it is possible to control the lyophobicity of the bank surfaces against the liquid material which is to be used for forming the lenses by changing the processing time for the plasma processing. For example, when the processing gas in plasma form is irradiated against the surfaces of the banks for a long time period, the lyophobicity of the bank surfaces is enhanced. In other words, it is possible to bring the lyophobicity to the desired state by managing the processing time period for the plasma processing. The lyophobicity of the bank surfaces is controlled so that the shape of the lenses comes to attain the desired shape, as will be explained hereinafter. The lyophobicity of the bank surfaces, for example, is managed based upon the angle of contact (the dynamic contact angle or the static contact angle).

If acrylic resin, polyimide resin, fluoro type resin, silicon or the like is utilized as the material for forming the banks, it can often happen that these materials are themselves endowed with lyophobicity against the liquid material from which the lenses are to be made. If the material for forming the banks itself is endowed with lyophobicity against the liquid material from which the lenses are to be made, the process of lyophobicity enhancement may be omitted.

The Lens Material Distribution Process

Figure 1C:
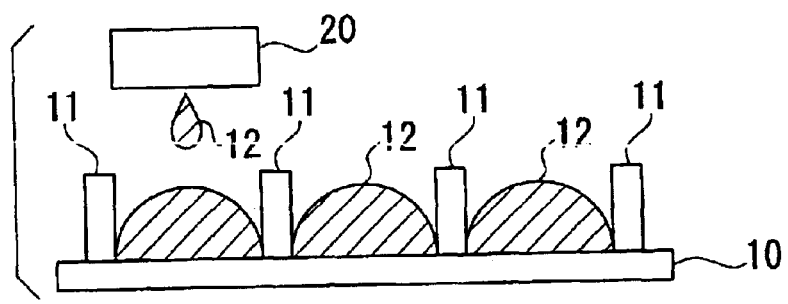

Next, as shown in FIG. 1C, the lens material 12 is distributed into the regions upon the substrate 10 which have been demarcated by the banks 11. It is desirable to utilize, for this lens material, a material which is transparent and has a high refractive index; for example, an optically setting or thermo-setting resin, or an inorganic material, or the like. In the shown example an optically setting resin is utilized, in order to lower the temperature at which the solidification process is performed.

During the distribution of the lens material 12, a liquid drop discharge method (a so called ink-jet method) is utilized, in which the liquid material is discharged in the form of liquid drops. In the distribution of liquid material using such a liquid drop discharge method, for example, in a state in which a nozzle formed upon a discharge head 20 is pointed towards the substrate 10, the lens material 12 is discharged from the nozzle one drop at a time towards the substrate 10 in the form of liquid drops, the amount of the liquid drop in which has been controlled, while causing relative displacement (scanning) between the discharge head 20 and the substrate 10.

Various discharge techniques are available as a liquid discharge method, for example, the electrification control method, the pressurization vibration method, the electromechanical conversion method, the electro-thermal conversion method, the static aspiration method, and the like. The electrification control method is one in which an electric charge is imparted to the material with a charging electrode, and the material is discharged from the nozzle while controlling the direction in which it flies away with a deflection electrode. The pressurization vibration method is one in which a very high pressure of about 30 $kg/cm^2$ is applied to the material and thereby the material is discharged from the tip of the nozzle, and if no control voltage is applied then the material is discharged from the nozzle in a straight line, whereas, when a control voltage is applied, static repulsion is generated in the material, and the material is scattered and thereby is not discharged from the nozzle. The electromechanical conversion method is one in which advantage is taken of the characteristic of a piezo element of being deformed when it is subjected to a pulse type electrical signal, so that, by deformation of such a piezo element, pressure is applied via a flexible member to the space in which the material is stored and thus to the material, so that the material is pushed out from this storage spaces and is discharged from the nozzle. The electro-thermal conversion method is one in which the material is abruptly evaporated by a heater which is provided within a chamber in which the material is stored and bubbles are generated therein, and the material in the storage chamber is thus discharged by the pressure of the bubbles. The static aspiration method is one in which a minute pressure is applied within the chamber in which the material is stored so as to form a meniscus of the material in the nozzle, and in this state the material is pulled out of the nozzle by applying static electric tension. Apart from these, it would also be possible to apply a technique such as a method of utilizing viscosity change of the fluid material due to application of an electric field, or a method of causing the material to fly out with a spark discharge, or the like.

The liquid drop discharge method has the beneficial aspects that wasteful use of the material is minimized, and moreover that it is able to distribute the material accurately in the desired places and in the desired quantities. In this example, the above described electromechanical conversion method (the piezo method) is utilized.

Figure 2:
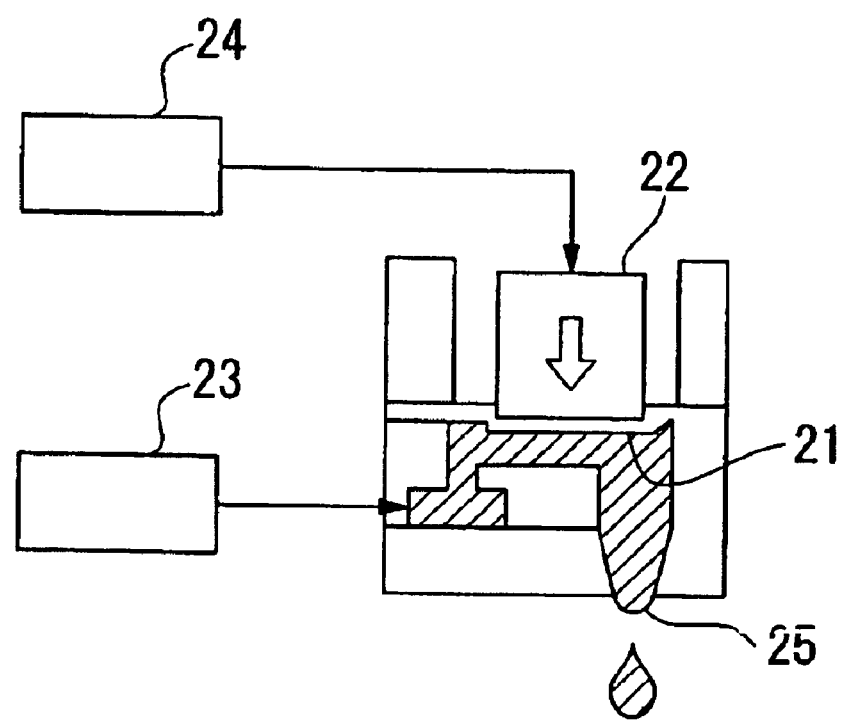
FIG. 2 is a figure for explanation of a principle, according to a piezo method, by which liquid material is discharged.

FIG. 2 is a figure for explanation of the principle by which the liquid material is discharged, according to the piezo method.

Referring to this figure, a piezo element 22 is disposed in the vicinity of and in contact with a liquid chamber 21 in which the liquid material is stored. The liquid material is supplied to the liquid chamber 21 via a liquid material supply system 23 which includes a liquid material tank in which the liquid material is stored. The piezo element 22 is connected to a drive circuit 24, and by voltage being applied to the piezo element 22 via this drive circuit 24 so that this piezo element 22 is deformed, the liquid chamber 21 is likewise deformed, and the liquid material therein is discharged from the nozzle 25. At this time, the amount of deformation of the piezo element 22 is controlled by varying the value of the voltage which is applied. Moreover, the speed of deformation of the piezo element 22 can be controlled by varying the frequency of the applied voltage. Since, with this piezo method of liquid drop discharge, no heat is applied to the liquid material to be discharged, there is the beneficial aspect that it is unlikely that any negative influence will be exerted upon the composition of this liquid material.

Returning to FIG. 1C, in this example, the lens material 12 in liquid form which has been distributed is prevented from spreading out along the banks 11, since the surfaces of the banks 11 have been processed so as to be endowed with lyophobicity. Due to this, under the influence of surface tension, the lens material 12 assumes a form which has a convex curved upward surface. The form of this curved surface is regulated, as has been described previously, by controlling the lyophobicity of the surfaces of the banks 11 (including their wall surfaces), so that the desired optical functions may be obtained.

The Lens Solidification Process

Figure 1D:
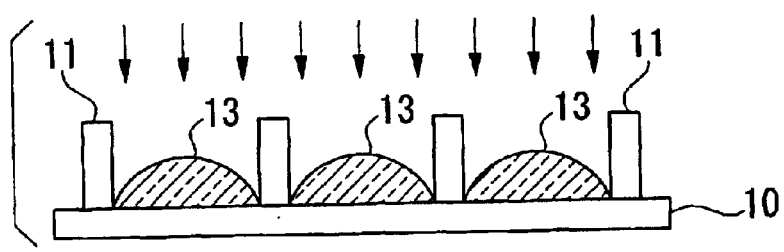

Next, as shown in FIG. 1D, the lens material 12 which has been distributed on the substrate 10 is solidified. This solidification processing is performed by irradiating light of a predetermined wavelength upon the lens material 12. If heat-solidifying resin has been utilized for the lens material, the solidification processing is performed by heating up the lens material to a predetermined temperature. By this solidification processing, lenses 13 with convex curved upper surfaces are formed in the regions which have been demarcated by the banks 11.

The Functional Material Distribution Process

Figure 1E:
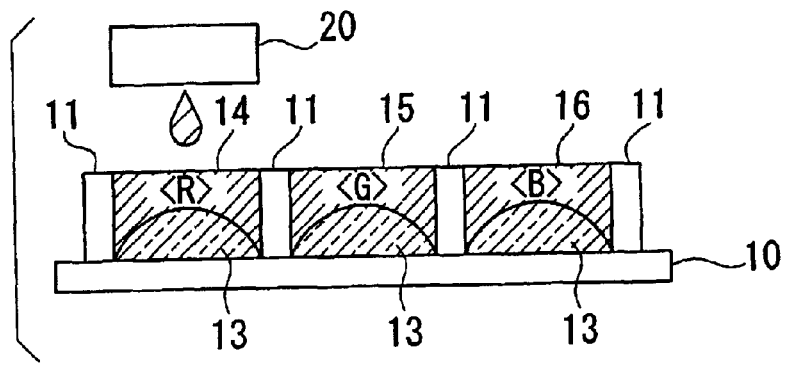

Next, as shown in FIG. 1E, as functional materials, red (R), green (G), and blue (B) colored materials 14, 15, and 16 are distributed in the regions which have been demarcated by the banks 11. Since the above-described convex curved surface lenses 13 have already been formed in the regions which have been demarcated by the banks 11, the colored materials 14, 15, and 16 are layered over the curved surface lenses 13 within the banks 11 by this distribution of the colored materials 14, 15, and 16.

As the colored material for these color filters, one may be utilized which includes, for example, light absorbent type pigment. For example, these colored materials may be obtained, after having dispersed the relevant one of R, G, and B inorganic pigments in a polyurethane oligomer or a polymethyl methacrylate oligomer, by adding cyclohexanon and butyl acetate as low boilers and butyl carbitol acetate as a high boiler, and furthermore by adding, as required, non ionic type surfactant as a dispersant, and by adjusting the viscosity to the desired level.

The above described liquid drop discharge method is used for distribution of the colored materials. In other words, for example, in the state in which the nozzle which is formed in the discharge head 20 is arranged to confront the substrate 10, while performing relative displacement (scanning) between the discharge head 20 and the substrate 10, the colored materials are discharged in the form of liquid drops towards the substrate 10 while controlling the amount of each one liquid drop which is discharged from the nozzle one drop at a time.

After the colored materials 14, 15, and 16 have been distributed within the banks 11, the solvent which is included in these colored materials 14, 15, and 16 is evaporated by heating processing or the like. By doing this, layers of the colored materials are formed over the substrate 10, and a color filter is formed which has layers of each of the colors R, G, and B.

With the above described method of manufacture of a color filter, the colored materials 14, 15, and 16 and the lenses 13 are accurately layered over one another within the banks 11, because both the colored materials 14, 15, and 16 which constitute optical functional material and the lens material 12 are distributed within the regions which have been demarcated by the banks 11. Since this type of liquid drop discharge method is utilized for distributing the material, there is little wastage in the usage of the lens material or the color material, and moreover the materials are accurately distributed within the banks 11 in the desired amounts. Accordingly, along with preventing positional deviation between the alignments of the colored material layers and the lenses, the desired optical relationship is established between the colored material layers and the lenses, and a color filter is manufactured which has high optical performance.

Figure 3:
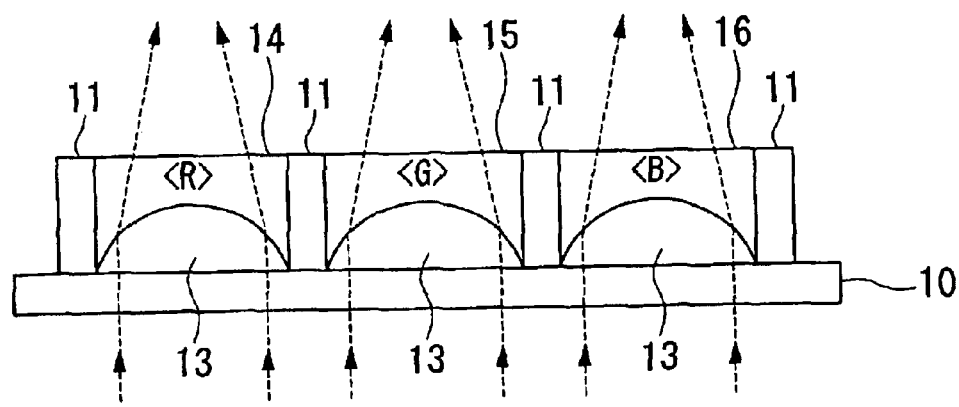
FIG. 3 is a figure showing in a schematic manner an exemplary embodiment of a color filter which has been manufactured by the above-described method of manufacture, as a preferred embodiment of the optical device of the present invention.

FIG. 3 is a figure which shows in a schematic manner an exemplary embodiment of a color filter which has been manufactured by the above-described method of manufacture, as a preferred embodiment of the optical device of the present invention.

As shown in FIG. 3, with this color filter, light which is incident from the side of the substrate 10 escapes therefrom after having passed through the lenses 13 and the colored materials 14, 15, and 16. At this time, along with the light being focused by passing through the convex lenses 13, it also is converted into light of predetermined wavelength bands by passing through the various colored materials 14, 15, and 16. It may be anticipated that the intensity of the exiting light will be enhanced by the focusing action of the convex lenses 13. Although, in this preferred embodiment, the lenses 13 which are formed within the banks 11 are convex lenses, this is not to be considered as being limitative of the shape of the lenses, in the present invention.

Figure 4:
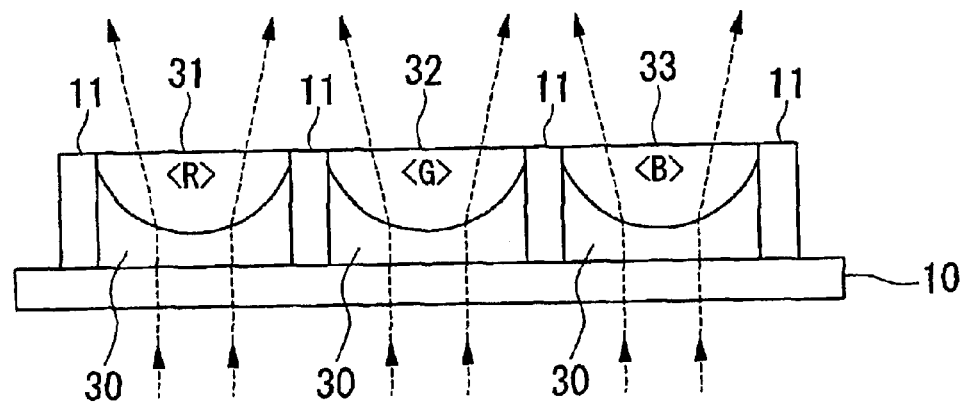
FIG. 4 is a figure showing in a schematic manner another preferred embodiment of the color filter.

FIG. 4 is a figure which shows in a schematic manner another preferred embodiment of a color filter.

Referring to this figure, this color filter differs from the previous color filter which has been shown above in FIG. 3, in that concave lenses 30 are formed within the banks 11. In other words, concave lenses 30 are formed in the regions upon the substrate 10 which have been demarcated by the banks 11, and colored material layers 31, 32, and 33 of the various colors R, G, and B are formed over these concave lenses 30. With this color filter as well, it is possible to count upon enhancement of the optical performance, since the colored materials and the lens material are distributed within the regions which have been demarcated by the banks 11 by being layered over one another, and accordingly positional deviation of the alignment between the colored material layers and the lenses is minimized.

With this color filter, the light which is incident from the side of the substrate 10 escapes after having passed through the concave lenses 30 and the colored materials 31, 32, and 33. At this time the light, along with being diverged by passing through the concave lenses 30, it also is converted into light of predetermined wavelength bands by passing through the various colored materials 31, 32, and 33.

FIGS. 5A through 5E are figures showing in a schematic manner a preferred embodiment of the method of manufacture of the color filter shown in FIG. 4. This method of manufacture of the color filter includes a bank formation process (FIG. 5A), a lyophilization process (FIG. 5B) a lens material distribution process (FIG. 5C), a lens solidification process (FIG. 5D), a functional material distribution process (FIG. 5E), and the like. For the lens material distribution process and for the functional material distribution process, a liquid drop discharge method, i.e. a so called ink-jet method, in which the liquid material is discharged via a nozzle in a discharge head in the form of liquid drops, is utilized.

Since the bank formation process, the lens material distribution process, the lens solidification process, and the functional material distribution process are the same as those which have already been explained with reference to FIG. 1, their explanation here will be omitted or simplified.

Figure 5A:
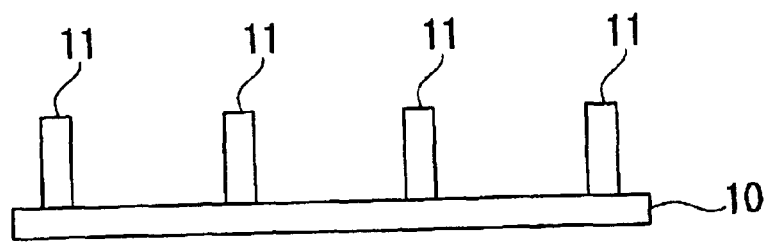
FIGS. 5A through 5E are figures showing in a schematic manner another preferred embodiment of the method of manufacture of a color filter.
Figure 5B:
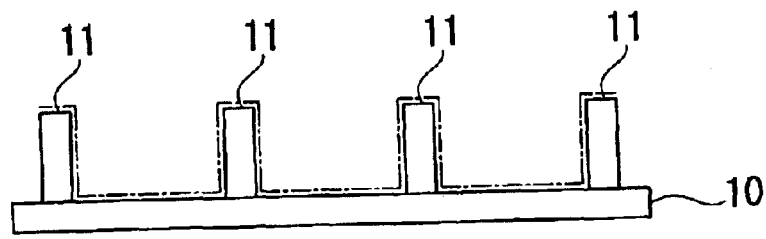

Referring to FIG. 5B, in the lyophilization process, before distributing the lens material 12, a process of lyophilization (or activation) of the surfaces of the banks 11 (including their wall surfaces) against the lens material 12 is performed. Apart from the use of decane or of UV irradiation, this lyophilization process can, for example, be implemented by using oxygen as the processing gas in the above described plasma polymerization method ($O_2$ plasma processing). In other words, by irradiating oxygen in the plasma state upon the surface of the object body, this surface can be lyophilized or activated.

Figure 5C:
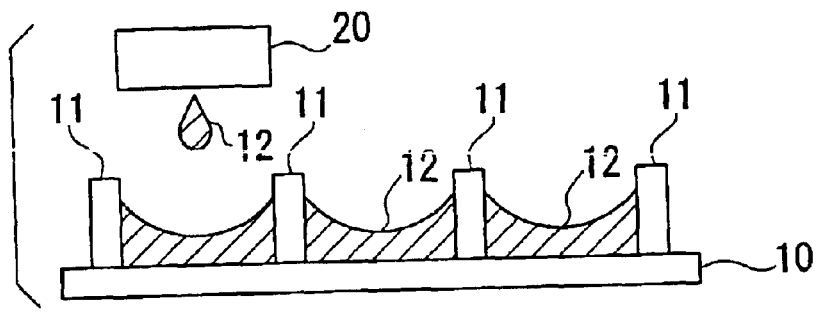
Figure 5D:
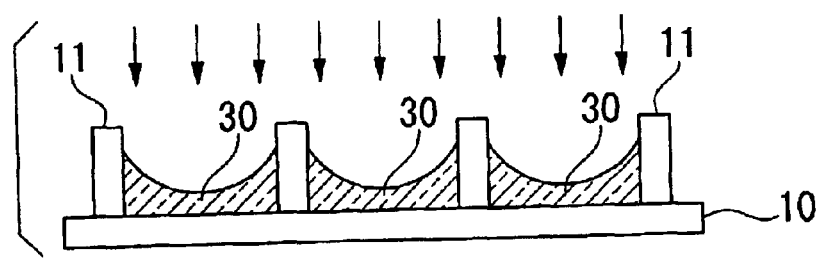
Figure 5E:
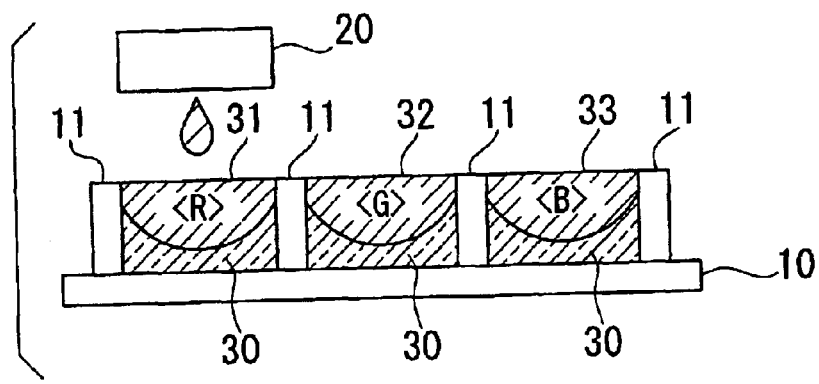

Referring to FIG. 5C, in the functional material distribution process, the wetting and spreading out within the banks 11 of the lens material 12 in the liquid state which has been distributed is encouraged, since the surfaces of the banks 11 have already been processed so as to increase their lyophilicity. Due to this, the lens material 12 comes to have a form which includes a concave shaped curved surface, by the influence of surface tension. After this, by solidifying the lens material 12, the concave shaped curved surface lenses 30 are formed within the regions which are demarcated by the banks 11.

Figure 6:
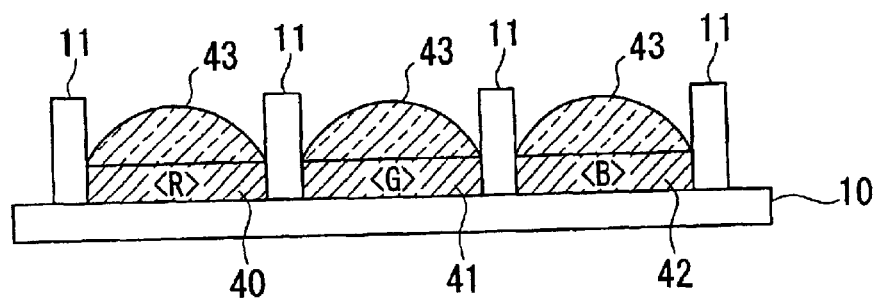
FIG. 6 is a figure showing in a schematic manner another preferred embodiment of the color filter.
Figure 7:
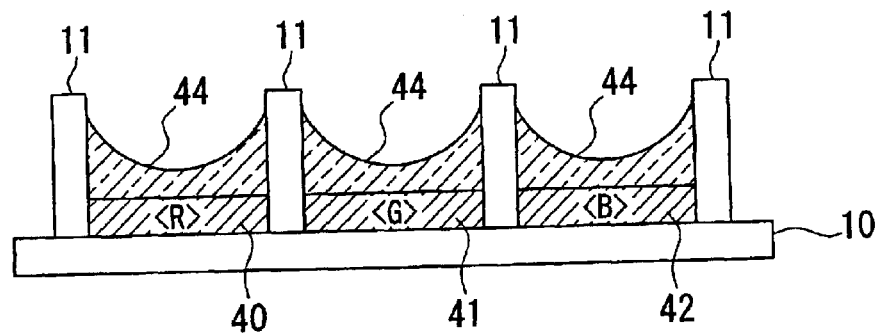
FIG. 7 is a figure showing in a schematic manner another preferred embodiment of the color filter.

FIGS. 6 and 7 are figures which show another preferred embodiment of a color filter in a schematic manner.

The color filters shown in FIGS. 6 and 7 differ from those preferred embodiments which were previously shown and described with reference to FIGS. 3 and 4, in that the various colored material layers 40, 41, and 42 are formed upon the substrate 10, and, respectively, the convex shaped curved surface lenses 43 or the concave shaped curved surface lenses 44 are formed over these colored material layers 40, 41, and 42. This color filter is manufactured by distributing the colored materials first, in the regions which are demarcated by the banks 11, and by distributing the lens material subsequently. Since, in this manufacturing process as well, both the colored materials and the lens material are distributed as being layered together in the regions which have been demarcated by the banks 11, thereby deviation of the relative positional alignment of the colored materials and the lenses is prevented, and accordingly it is possible to manufacture an optical device of high optical performance.

Figure 8A:
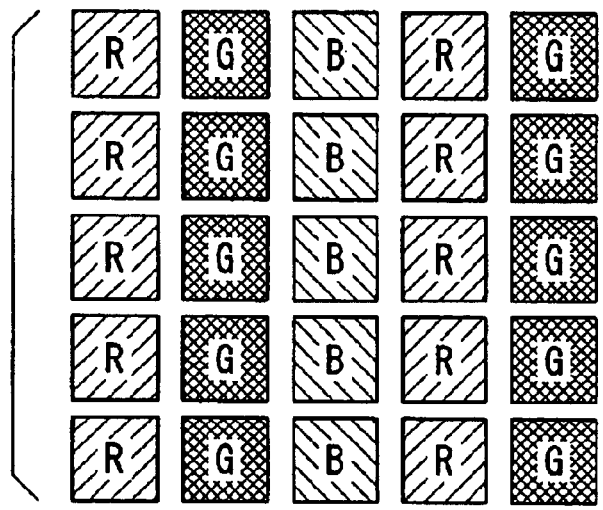
FIGS. 8A through 8C are figures showing various planar distribution patterns of color materials used in a color filter which is an optical device according to the present invention.
Figure 8B:
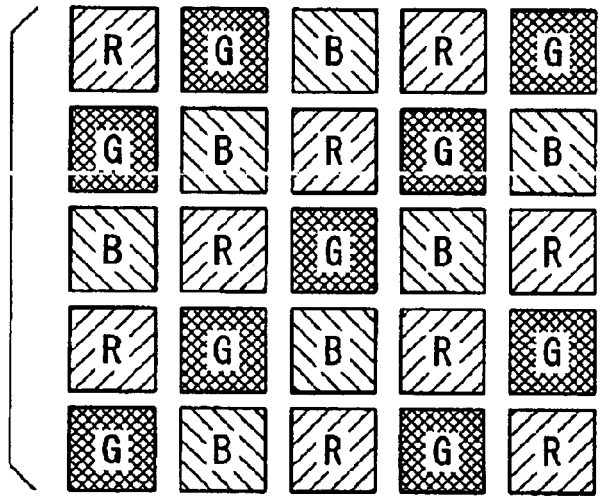
Figure 8C:
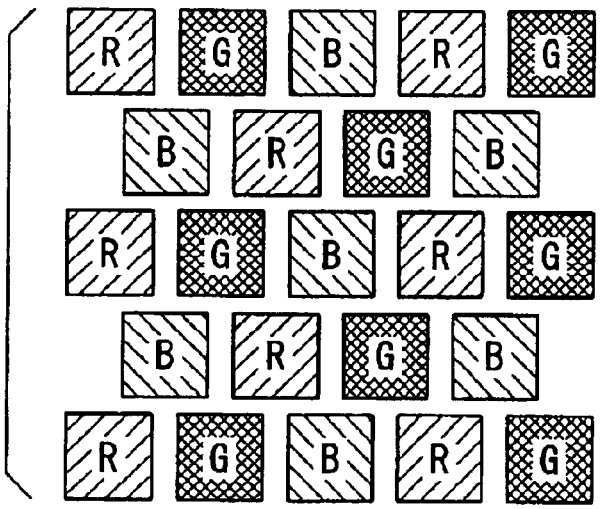

FIGS. 8A, 8B, and 8C are figures which show various planar distribution patterns of the color materials used in a color filter, which is an optical device according to the present invention.

FIG. 8A shows a pattern in which the various color materials are distributed in a stripe arrangement; FIG. 8B shows a pattern in which the various color materials are distributed in a mosaic arrangement; and FIG. 8C shows a pattern in which the various color materials are distributed in a delta arrangement (a matrix arrangement).

Any one of these patterns may be applied as the pattern for distribution of the colored materials for the color filter according to the present invention.

Figure 9:
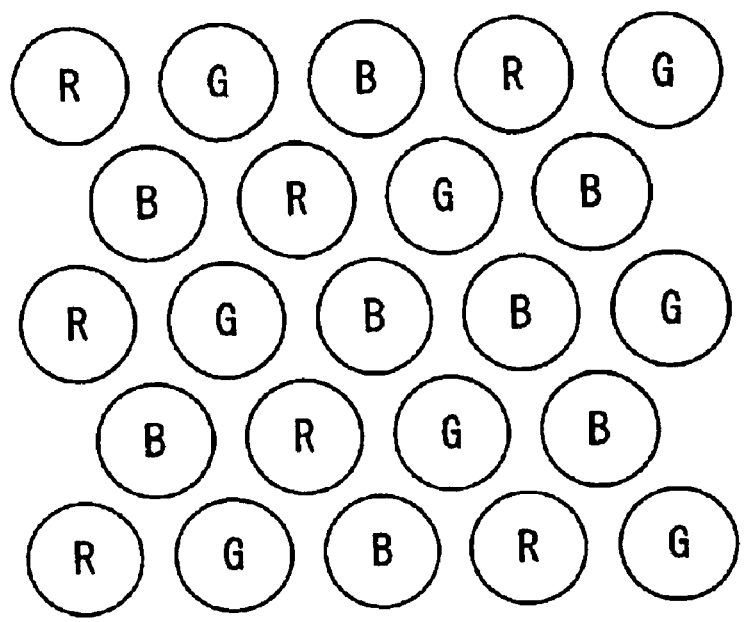
FIG. 9 is a figure showing an example of the planar structure of a color filter which is an optical device according to the present invention.
Figure 10:
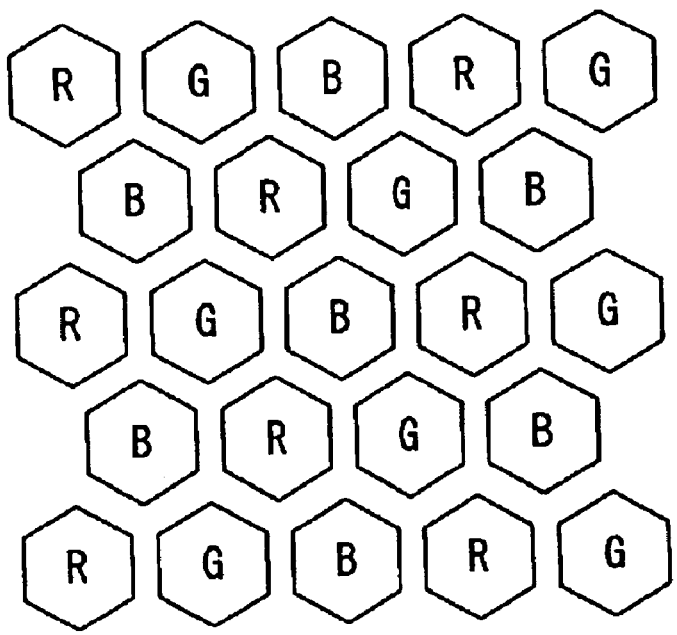
FIG. 10 is a figure showing another example of the planar structure of a color filter which is an optical device according to the present invention.

FIGS. 9 and 10 are figures which show various examples of the planar structure of a color filter which is an optical device according to the present invention.

With the color filter shown in FIG. 9, along with the various R, G, and B colored materials being distributed in a delta arrangement (a matrix arrangement), the planar shape of each of the regions over which colored material is distributed is a circular shape. In other words, the planar shape of each of the regions over which colored material is distributed is demarcated by the banks as being a circular shape, and the colored materials and the lenses are distributed within these demarcated regions so as to be overlaid together. Since the demarcated regions are of circular shape, the surface tension works effectively during distribution of the lens material into the demarcated regions, and accordingly it is ensured that the lenses which are produced have the desired curved surface shapes.

On the other hand, with the color filter shown in FIG. 10, along with the various R, G, and B colored materials being distributed in a delta arrangement (a matrix arrangement), the planar shape of each of the regions over which colored material is distributed is a hexagonal shape. In other words, the planar shape of each of the regions over which colored material is distributed is demarcated by the banks as being a hexagonal shape, and the colored materials and the lenses are distributed within these demarcated regions so as to be overlaid together. Since the demarcated regions are of hexagonal shape, in the same way as in the case of circular shape, the surface tension works effectively during distribution of the lens material into the demarcated regions, and accordingly it is ensured that the lenses which are produced have the desired curved surface shapes. Moreover, as compared to the FIG. 9 case in which the demarcated regions are formed of circular shape, there is less wastage in the arrangement of the demarcated regions, and the proportion of openings is enhanced.

Yet further, the demarcated regions might also be formed as polygons other than regular hexagons, or might be formed as elliptical; and it would also be acceptable for a plurality of such shapes to be combined. Apart from it being possible to anticipate enhancement of the opening ratio due to effective distribution of the demarcated regions by arranging the demarcated regions, which are accurately formed, in accurate positions, it also becomes possible, by combining such a plurality of shapes, to correct the amounts of light between the various demarcated regions.

Figure 11:
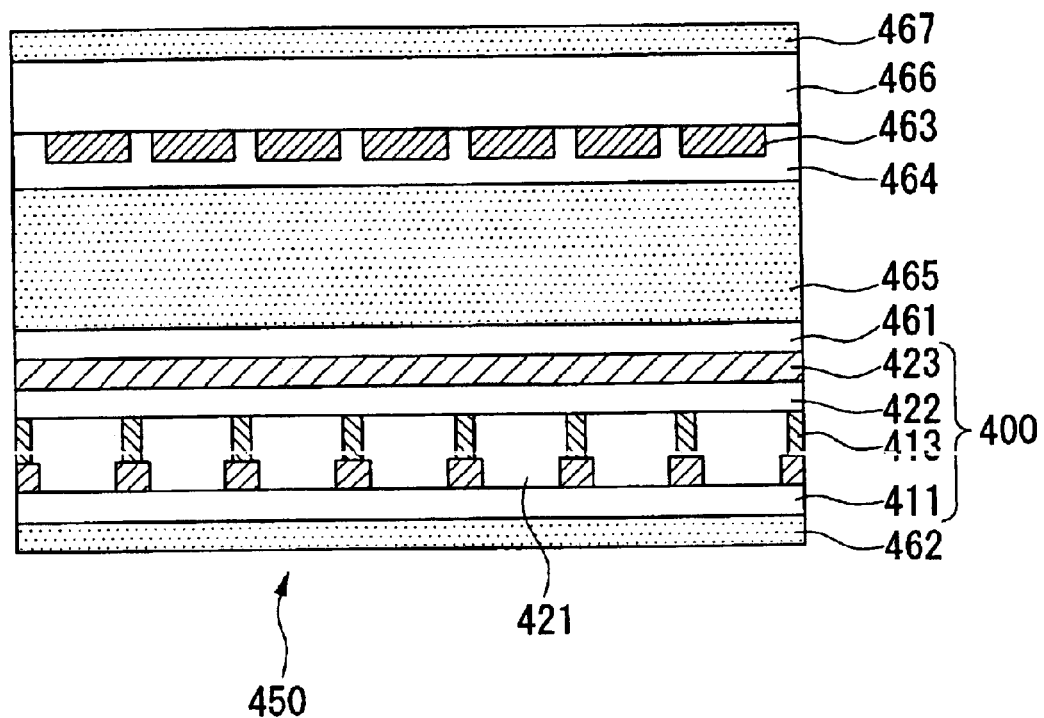
FIG. 11 is a sectional view showing a preferred embodiment of the present invention, in which the display device of the present invention has been applied to a liquid crystal display device.

Next, FIG. 11 is a sectional view showing a preferred embodiment of the present invention, in which the display device of the present invention has been applied to a liquid crystal display device. Referring to this figure, the liquid crystal display device 450 is built up by combining together a color filter 400 and an opposing base plate 466 between upper and lower polarization plates 462 and 467, and by sandwiching a liquid crystal assembly 465 between them. Orientation films 461 and 464 are formed between the color filter 400 and the opposing base plate 466, and TFT (thin film transistor) elements (not shown in the figure) and pixel electrodes 463 are formed in a matrix configuration on the inner side surface of that one of the opposing base plate 466.

The color filter 400 comprises pixel elements (filter elements) which are arranged in a predetermined pattern, and the boundaries between adjacent ones of the pixel elements are defined by divisions (banks) 413. Into each one of the pixel elements there is fed colored material of one of the colors red (R), green (G), and blue (B). Each of these colored materials constitutes an adhered color layer 421. An overcoat layer 422 and an electrode layer 423 are formed over the upper surfaces of the divisions 413 and the adhered color layers 421.

With this display device, a color filter which has been manufactured by the above-described method of manufacture is utilized for the color filter 400. Due to this, the optical performance is high, so that it is possible to anticipate enhanced display performance.

Figure 12A:
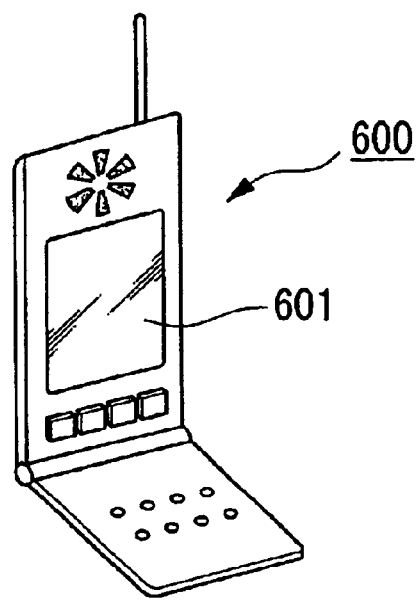
FIGS. 12A through 12C are figures showing various preferred embodiments of the electronic device according to the present invention.
Figure 12B:
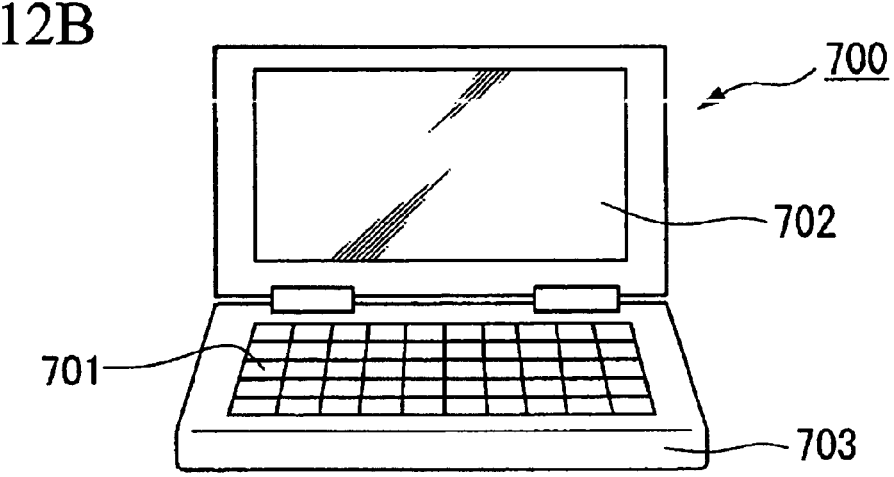
Figure 12C:
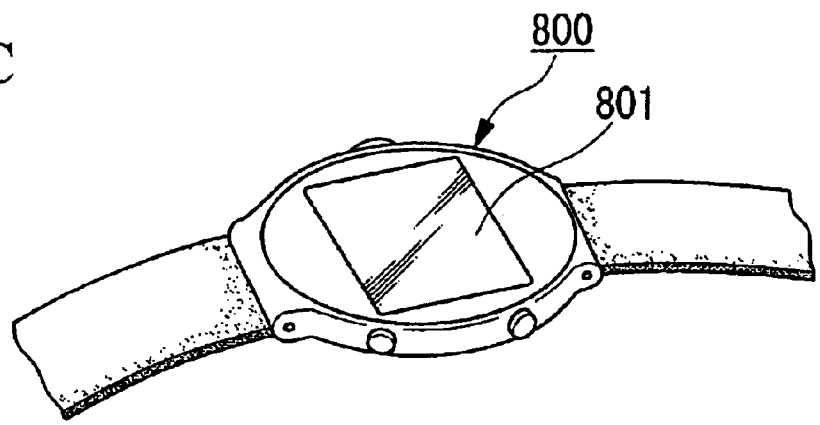

FIGS. 12A through 12C show various preferred embodiments of the electronic device according to the present invention.

Each of these electronic devices comprises, as a display means, a display device according to the present invention, such as the above described liquid crystal display device or the like.

FIG. 12A is a perspective view showing an example of a portable telephone. In this figure, the reference symbol 600 denotes the portable telephone as a whole, while the reference symbol 601 denotes its display section, for which said display device is used.

FIG. 12B is a perspective view showing an example of a portable type information processing device such as a word processor, a personal computer, or the like. In this figure, the reference symbol 700 denotes the information processing device as a whole, the reference symbol 701 denotes an input section such as a keyboard or the like, and the reference symbol 703 denotes the main body of the information processing device, while the reference symbol 702 denotes its display section, for which said display device is used.

FIG. 12C is a perspective view showing an example of a wristwatch type electronic device. In this figure, the reference symbol 800 denotes the main body of the watch, while the reference symbol 801 denotes its display section, for which said display device is used.

It is possible to implement a display of excellent quality with each of the electronic devices shown in FIGS. 12A through 12C, since each of them comprises, as display means, a display device according to the present invention.

Figure 13A:
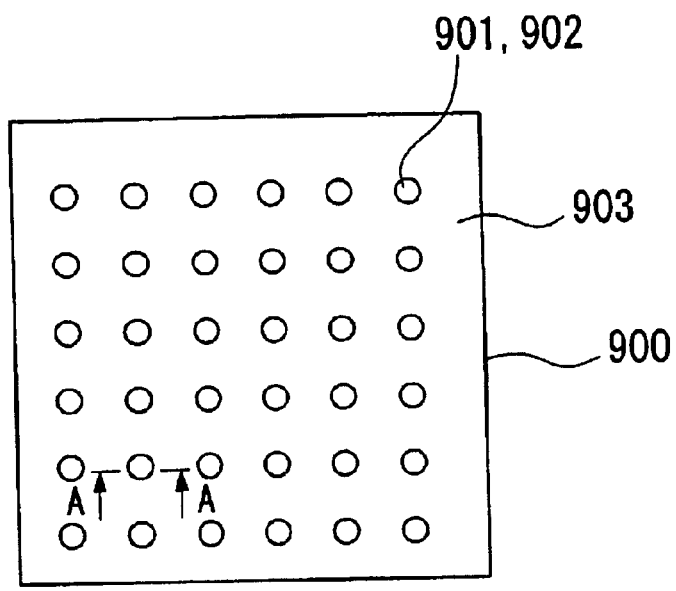
FIGS. 13A through 13C are figures showing a preferred embodiment in which the optical device of the present invention has been applied to a biochip.
Figure 13B:
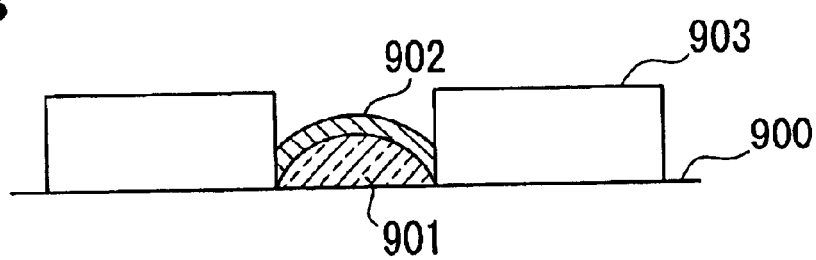
Figure 13C:
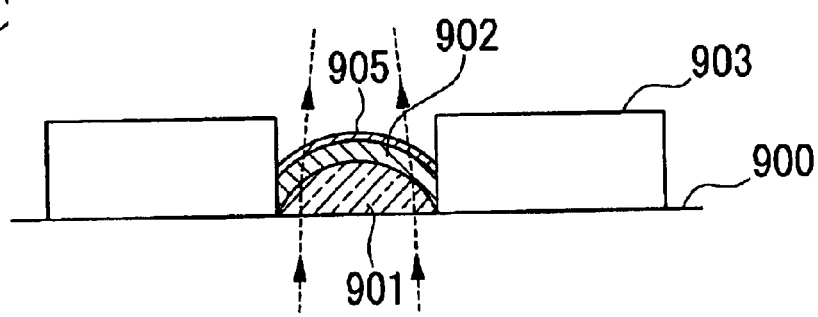

Next, FIGS. 13A, 13B, and 13C are figures which show a preferred embodiment in which the optical device of the present invention has been applied to a biochip, as a detection device; and FIG. 13A is a plan view thereof, while FIGS. 13B and 13C are sectional views along the lines A—A. In the following, the explanation will focus upon a genetic (DNA) biochip.

In FIGS. 13A and 13B, the biochip of this preferred embodiment is made with a curved surface lens 901 provided upon a substrate 900, and which a reaction material 902 fixed over this lens 901. The lens 901 and the reaction material 902 are distributed in regions which are demarcated by banks 903, being layered together therein. As a reaction material for this biochip, for example, DNA fragments may be used. From several tens to several hundreds of types of DNA fragments, of which the genetic arrangement is ascertained in advance, are included in a solution, and they are fixed to corresponding ones of the banks 903.

Furthermore, as shown in FIG. 13C, with the biochip of this preferred embodiment, light which is incident from the rear side upon the substrate 900 passes through the lens 901 and the reaction material 902 and escapes from the front side. During the use of this biochip, a gene sample 905 in liquid form is prepared, and this is distributed over the chip. If a gene which matches the sample is present, its base sequence is specified by reaction with the reaction material 902 due to an acquisition reaction, and this generates fluorescence due to a fluorescent dye which has been combined therewith. The light which is incident from the rear side upon the substrate 900 is focused by the lens 901, and the intensity of the light which is emitted from the front side increases, so that the visibility is enhanced.

Figure 14A:
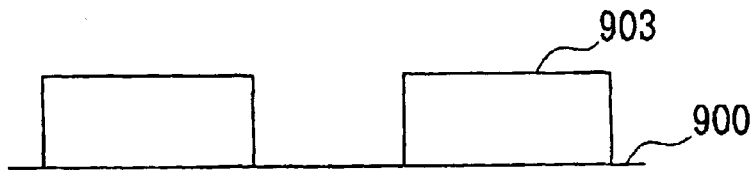
FIGS. 14A through 14E are figures showing in a schematic manner a process of manufacture for a biochip.
Figure 14B:
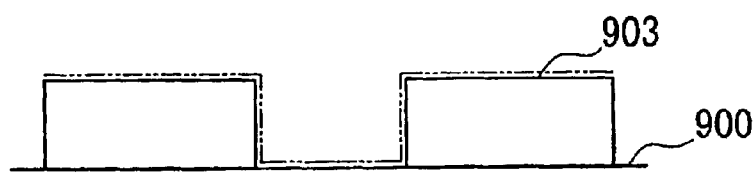
Figure 14C:
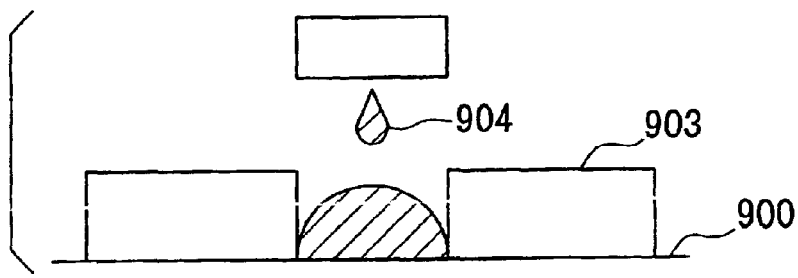
Figure 14D:
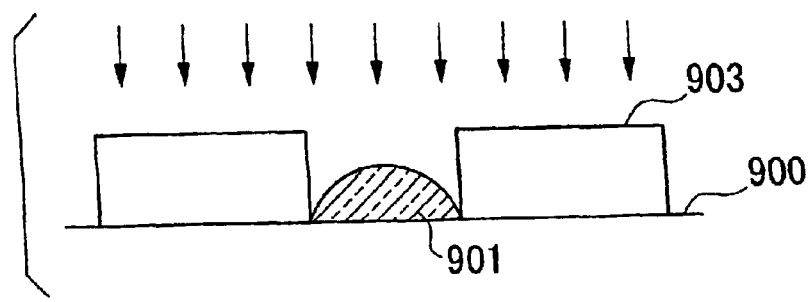
Figure 14E:
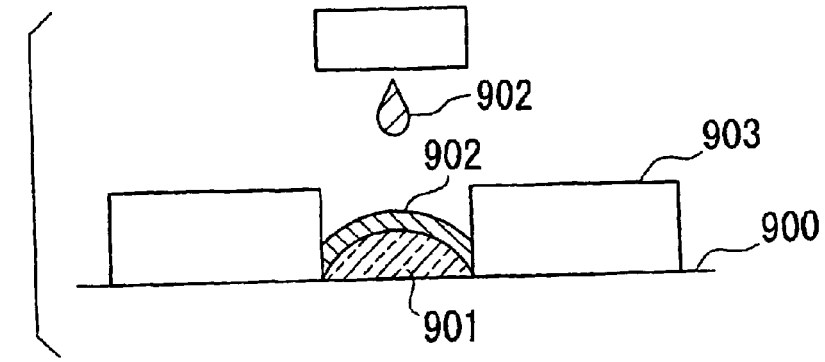

FIGS. 14A, 14B, and 14C are figures which show a process of manufacture for the above-described biochip in a schematic manner. For the sake of simplicity, in FIGS. 14A through 14C, only the cross section which has been shown in FIG. 13B is partially shown in magnified view. The method of manufacture of a biochip of this embodiment includes a bank formation process (FIG. 14A), a lyophobicity enhancement process (FIG. 14B), a lens material distribution process (FIG. 14C), a lens solidification process (FIG. 14D), a reaction material distribution process (FIG. 14E), and the like.

In concrete terms, first, the banks 903 which demarcate the regions in which the reaction material is to be distributed are formed upon the substrate 900, and the surfaces of these banks 903 are processed so as to enhance their lyophobicity. Next, the lens material 904 is distributed in the regions which are demarcated by these banks 903, this lens material 904 is solidified, and thereby the convex shaped curved surface lenses 901 are formed within the banks 903. Next, the reaction material 902 is distributed in the regions which are demarcated by the banks 903, and is fixed upon the lens 901. The biochip is manufactured in this manner. Various types of raw material may be selected, according to requirements. For the distribution of the lens material 904 and of the reaction material 902, there is employed a liquid drop discharge method, i.e. a so called ink-jet method, in which the liquid material is discharged in the form of liquid drops via a nozzle in a discharge head.

With the above described method of manufacturing this biochip, since both the reaction material 902 which serves as the functional material, and also the lens material 904, are distributed in the regions which are demarcated by the banks 903, thereby the lens material 904 and the reaction material 902 are accurately layered together within the banks 903. Since a liquid drop discharge method is employed for distributing these materials, there is little wastage in the use of the lens material or of the reaction material, and moreover the desired quantity of material is precisely distributed within the banks 903.

In the preceding disclosure, various preferred embodiments of the present invention have been explained with reference to the appended drawings, but the present invention is not to be considered as being limited to these disclosed preferred embodiments. The structures of the various elements described in the examples above, and their combinations, are only exemplary; according to requirements, various alterations of the details of any particular embodiment are possible without departing from the scope of the present invention, provided that its gist is adhered to.

What is claimed is:

1. A method of manufacture of an optical device comprising:
    a process of formation of a lens within a bank which demarcates predetermined region upon a substrate, using a lens material in the liquid state; and
    a process of distribution of functional material within said bank.

2. A method of manufacture of an optical device according to claim 1, wherein said process of formation of said lens using said lens material in the liquid state comprises a process of distribution of said lens material in the liquid state within said bank, and a process of drying said lens material.

3. A method of manufacture of an optical device according to claim 1, further comprising, before said process of distribution of said lens material, a process of processing the surface of said bank so as to increase its lyophobicity or lyophilicity against said lens material.

4. A method of manufacture of an optical device according to claim 3, wherein a convex lens is formed in said demarcated region by processing of said surface of said bank to increase its lyophobicity.

5. A method of manufacture of an optical device according to claim 3, wherein a concave lens is formed in said demarcated region by processing of said surface of said bank to increase its lyophilicity.

6. A method of manufacture of an optical device according to claim 1, wherein a liquid drop discharge method in which liquid material is discharged in the form of liquid drops is utilized for distribution of at least one of said functional material and said lens material.

7. A method of manufacture of an optical device according to claim 1, wherein a liquid drop discharge method in which liquid material is discharged in the form of liquid drops is utilized for distribution of material for formation of said bank which demarcates said predetermined region.

8. A method of manufacture of an optical device according to claim 1, wherein the plan view form of the region which is demarcated by said bank is polygonal, elliptical, or roughly circular.

9. A method of manufacture of an optical device according to claim 1, wherein said functional material is a color material which is used for color filtration.

10. A display device which comprises a color filter manufactured by a method of manufacture of an optical device according to claim 9.

11. An electronic device which comprises a display device according to claim 10.

12. A method of manufacture of an optical device according to claim 1, wherein said functional material is a reaction material for use in a biochip.

13. A detection device which employs a detection plate which has been manufactured by the method of manufacture of an optical device described in claim 12.

14. An optical device comprising:
  a bank which demarcates a region upon a substrate in which functional material is distributed; and
  a lens which is disposed in said region which has been demarcated by said bank, and which is layered against said functional material.

* * * * *